April 26, 1938.   D. SAMIRAN   2,115,043
FLUID SEGREGATING APPARATUS
Filed Jan. 29, 1936
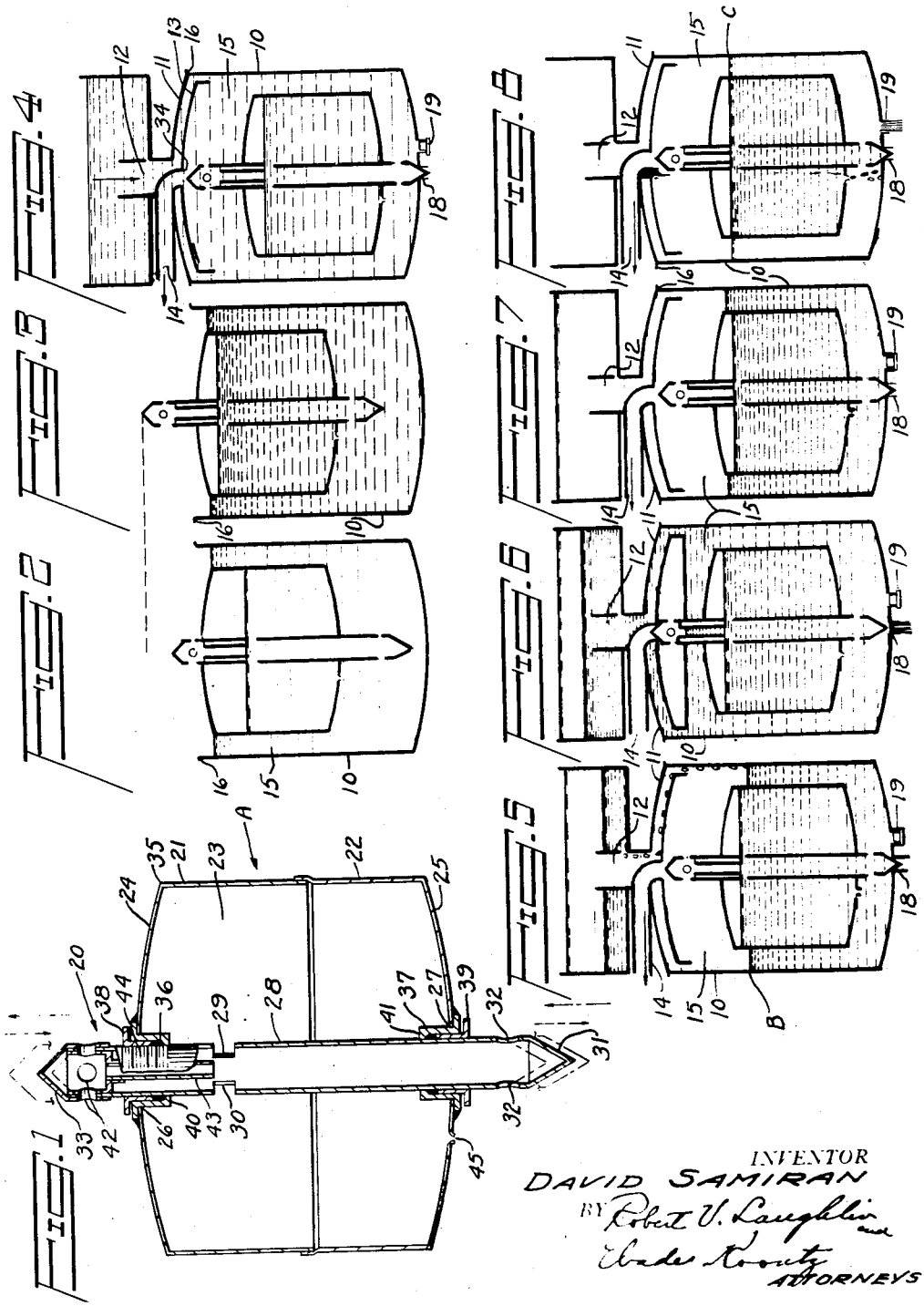
INVENTOR
DAVID SAMIRAN
BY
ATTORNEYS

UNITED STATES PATENT OFFICE 2,115,043

FLUID SEGREGATING APPARATUS

David Samiran, Dayton, Ohio

Application January 29, 1936, Serial No. 61,361

14 Claims. (Cl. 137—68)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to apparatus for the automatic isolation of fluids and more particularly to apparatus having float means responsive to fluids having densities greater or less than a fluid of given density and is particularly concerned in the adjusting of a float controlled device to a desired density.

Reference is made to my copending application Serial No. 448,391, filed April 29, 1930, in which I have described a novel method and means for obtaining an adjustment of a float to a predetermined specific gravity or density by adjusting the same within a liquid of the same or a known specific gravity, and to my copending application Serial No. 610,297, filed May 9, 1932, in which I have described an improved float device which is normally adjusted to have a known buoyancy in a given reference medium and which is characterized by including novel means for varying the volume of the float to any desired density so that the resultant buoyant force of the float due to the change in the density of the overlying liquid with which the reference medium is associated will cause a change in the immersion of the float inversely proportional to the difference in the densities of the reference medium and that of the overlying medium.

The present invention has for its primary object to provide an improved method of and means for automatically adjusting a float device to a predetermined weight.

My invention has for another object to provide a new and improved self-adjusting float controlled valve device that, when adjusted to a predetermined weight for a reference medium, its upper surface will automatically assume a position between the upper surface level of a reference medium and the upper surface level of any medium having a density less than the density of the reference medium, which position will vary in proportion to the difference in their densities.

A further object of the present invention is to provide in a self-adjusting float controlled valve device of this character novel means adapted for adjusting said device to any one of a number of predetermined weights to which said device is capable of adjustment.

A still further object of the present invention is to provide in a self-adjusting float controlled valve device of this character novel means for adjusting said device to any one of a number of predetermined weights, said means including graduated means for visually indicating when said float device is adjusted to have a weight slightly less than the weight of the reference medium displaced by its entire volume but greater than the weight of a similar volume of any other medium of less density.

A still more important object of the present invention is to provide in a self-adjusting float controlled valve device of this character a new and novel means for effecting a change in the relation between the volume of the float and the quantity of weighting liquid, said means being self-contained within the float device and capable of adjustment relative to a fixed float reference.

With these and other objects in view, the invention consists in the construction and arrangement of the several parts, all of which will be first duly described and afterwards specifically pointed out in the appended claims.

Referring more particularly to the accompanying drawing:

Fig. 1 is a vertical sectional view of my improved float device;

Fig. 2 is a diagrammatic view of the float device as applied to a fluid segregating apparatus illustrating the relation of the several elements when said device is adjusted to a light liquid;

Fig. 3 is a diagrammatic view of the float device adjusted to a heavy liquid such, for example, as water; and Figs. 4 to 8, inclusive, illustrate diagrammatically a cycle of operation of the float device.

Referring more particularly to the drawing wherein corresponding parts are designated by like numerals throughout the several views, the apparatus in the preferred embodiment of my invention herein illustrated, in connection with which the float means to be hereinafter described embodies the principles set forth in my copending application Serial No. 448,391, filed April 29, 1930, comprises an outer casing 10, which includes a removable top plate 11, an upper inlet passage 12, a deflector 13 and the outlet passage 14. The outer casing 10 is provided with a float chamber 15. This chamber is conventionally shaped and is provided with an upper flanged portion 16 which may be suitably secured to the peripheral edge portion of the top plate 11 by any suitable means such as bolts or rivets (not shown). The bottom portion 17 of the float chamber is provided centrally with a valve seat 18 and is also provided with a drain cock 19 adjacent to the valve seat which forms a discharge passage for draining fluids.

As shown more particularly in Fig. 1 a valve device 20 is disposed within the float chamber 15. This device is controlled by a float, generally identified by the letter A, which is constructed of two cylindrical sections—an upper section 21 and a lower section 22. These sections have their open ends joined together by telescoping the lower open end of the upper section 21 within the upper enlarged end of the lower section 22. The telescoping portions of cylindrical sections 21 and 22 may be secured together by any suitable means as by brazing to render the joint between the sections fluid tight. The float is provided with a chamber 23 adapted for receiving a fluid for adjusting the float in substantially the identical manner disclosed in my above-referred to copending application. The outer or closed end 24, 25 of each cylindrical section, respectively, is formed with a spherical section, the base diameter of which is equal to the diameter of each section and the radius of curvature of which may be computed by calculation in the manner set forth in my above-identified copending application.

The float A is provided with upper and lower central openings 26 and 27, respectively, within which is disposed an upstanding tubular member 28, the extreme ends of which extend exteriorly of the float A as shown in Fig. 1. Intermediate its ends the tubular member 28 is provided with cut-out portions 29, 30 forming passageways connecting the interior of the float chamber with the inner bore of the upstanding tubular member 28. The lower end of the tubular member 28 is formed with a needle valve 31 adapted to engage the valve seat 18. There is also formed in the tubular member 28 adjacent the needle valve 31 a plurality of openings 32 which permit the entrance of liquid from the float chamber 15 into the tubular member 28.

The opposite or upper end of the tubular member 28 is provided with an upper needle valve 33 which is adapted to engage with an upper valve seat 34 provided at the entrance of the outlet passage 14.

The upstanding tubular member 28 is adjustably mounted within the float A in order that the distance of the cut-out portions 29 and 30 from the upper edge, designated by the numeral 35, may be varied as desired. The upper edge 35 represents a reference which is used in determining the depth to which the float device must sink in the reference medium in adjusting the float device as a whole to have the desired buoyancy. In order to adjustably mount the tubular member 28 within the float A, I provide upper and lower stuffing boxes 36 and 37 having the usual locking sleeves and nuts 38 and 39, respectively, the operation of which tends to compress the packing 40 and 41 provided in each stuffing box. Obviously, when the locking sleeves are loosened, the upstanding tubular member 28 may be moved relative to the float A in effecting an adjustment of the cut-away portions 29 and 30 or away from the reference 35. The upper end of the tubular member 28 is provided with openings 42. There is also provided in the upper end of the tubular member 28 a centrally disposed tubular member or standpipe 43 open to the atmosphere through the openings 42 heretofore-mentioned and having its lower end disposed at a point adjacent the upper edge of the cut-out portions 29 and 30, as shown in Fig. 1. The exterior surface of the upstanding tubular member 28 adjacent its upper end is provided with a series of graduations 44 which cooperate with the upper edge of the upper locking nut 38 to indicate the adjustment of the standpipe 43 with respect to the reference 35 to indicate when the standpipe has been positioned to measure a desired quantity of reference medium in adjusting the float device to one of a number of predetermined densities to which it is adjustable. The lower closed end 25 of the float A is provided with an inlet orifice 45, the purpose of which is to permit liquid to flow into the float chamber 23 when the float device is immersed in liquid contained in the float chamber 15. It is also obvious that the lower openings 32 provided in the upstanding member 28 permit ready access of liquid into the float chamber through the interior of said member. The effective cross-sectional area of the inlet orifice 45 is made sufficiently large to permit the admission of the reference medium into the float chamber 23 in adjusting the float device to said reference medium but is restricted in an amount sufficient to prevent drainage of the admitted reference medium from the float chamber 23 as long as the head of the liquid in which the float device is immersed is greater than the head of the reference medium admitted into the float chamber 23.

Having thus described the component parts of the invention, its operation is as follows: Let us assume that the chamber 15 is filled with a light liquid as diagrammatically shown in Fig. 2. The upstanding member 28 is adjusted so that the lower open end of the standpipe 43 is approximately in the position indicated in Fig. 2. The setting of the upstanding member 28 to this position—that is to say, to bring the lower edge of the standpipe 43 into adjusted position with respect to the reference edge 35 of the float, may be accomplished through the medium of the graduations 44 heretofore-mentioned. Obviously, if the float is immersed in the liquid contained within the chamber 15, the liquid in this chamber will readily enter the float chamber 23 through the inlet orifice 45 and the openings 32 provided in the lower end of the upstanding tubular member 28. Liquid in the float chamber 23 will cause the float device to sink into the liquid contained within the chamber 15 until the level of the liquid in the chamber 23 reaches the lower open end of the standpipe 43. The liquid, in rising in the float chamber 23, will chase the air from said chamber through the standpipe 43 and out through the upper openings 42 heretofore-mentioned. When the level of the liquid in the float chamber 23 reaches the lower edge of the standpipe 43, a desired volume of air will be trapped in the upper end of the float chamber as represented in Fig. 2. Thus, the float device is caused to assume a predetermined position within the liquid in which it is immersed with the upper level of the liquid substantially coincident with the line of reference formed by the upper edge 35 of the float A. When this condition exists, the float is "adjusted" to the desired reference medium or the medium in which it is immersed.

Fig. 3 illustrates the relative position of the upstanding tubular member 28 and the float A when said device is adjusted to a heavier liquid. It will be noted in referring to Fig. 3 that the upstanding tubular member 28 has been so adjusted that a greater quantity of liquid is admitted into the float chamber 23. Obviously, a lesser quantity of air will be trapped in the upper portion of the float chamber 23 when so adjusted. It should be noted, however, that in this adjusted position for the heavier liquid, the float will be immersed in the new reference medium so that the upper level of the heavier reference medium will be substantially coincident with the line of reference formed by the upper edge 35 of the float in the manner heretofore illustrated in connection with Fig. 2.

Fig. 4 illustrates the operation of the float device when applied to a fluid segregating apparatus. In this figure the standpipe 43 of the float device has been adjusted for a heavy liquid in the manner illustrated in Fig. 3. Suppose that, when so adjusted, the float chamber 15 is completely filled with a lighter liquid. Obviously, the float device will not be buoyant in this lighter liquid. Consequently, the float will not rise within the float chamber 15 but the lower needle valve 31 will seat on the valve seat 18 and, consequently, as long as the lighter liquid enters the float chamber 15 through the inlet passage 12, it will pass from the float chamber 15 through the outlet passage 14.

Fig. 5 illustrates the cycle of operation of the apparatus when a heavier liquid, or the liquid to which the float device has been adjusted, begins to enter the float chamber 15. Obviously, the lower needle valve 31 will remain seated as long as the upper level of the reference medium indicated by the letter B is below the reference line formed by the upper edge 35 of the float. Should, however, the upper level of the reference medium increase to an extent to completely fill the float chamber 15, as illustrated in Fig. 6, the float will become buoyant and move upwardly so as to close the outlet passage 14 and prevent the flow of the liquid therethrough. Obviously, with the float in the position illustrated in Fig. 6, the lower needle valve 31 will be unseated thus permitting the flow of the heavier liquid from the float chamber 15.

As long as the head of the liquid in the float chamber 15 is greater than the head of the reference medium contained within the float chamber 23, the liquid contained within the said float chamber 23 will remain therein. When, however, the head of the liquid in the float chamber 15 reaches the level C indicated in Fig. 8, the reference medium contained within the float will escape through the inlet orifice 45 heretofore mentioned.

It is apparent from the foregoing detailed description that I have provided a self-adjusting float controlled valve device, that is to say, one which is capable of adjusting self to any desired reference medium and which is so constructed and arranged as to be automatically drained of the reference medium when the conditions abovementioned in connection with the operation of my device are brought into existence.

Should it be desired to effect a segregation of liquids having specific gravities greater or less than the specific gravity of the liquid in which the float is normally adjusted, this same may be accomplished by varying the position of the standpipe 43 with respect to the "reference" formed by the upper edge 35 of the float. In so doing, the relation between the volume of the float and the quantity of liquid contained therein may be increased or decreased to cause the same to effect a change in the displacement of the liquid in which the float device is immersed. By means of this construction, it is possible to adjust the float device to any desired density within a given range so that a segregation of fluids having densities within the given range may be segregated by a simple manual adjustment of the standpipe 43.

Having thus fully described the invention, it will be obvious to those skilled in the art that the construction shown and described is subject to changes, alterations and modifications. I am fully aware of this and it is to be understood that the specific construction shown in the accompanying drawing is merely illustrative of the present preferred construction of my invention and that I consider myself clearly entitled to all such changes and modifications as fall within the limit and scope of the appended claims.

I claim:

1. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein and means cooperating with said float chamber for automatically determining the quantity of liquid to be admitted for obtaining the relation of the volume of the float and the combined weight of the admitted liquid and said container necessary for said predetermined density relation.

2. A float device adapted to be adjusted to a predetermined density relation with respect to any one of a plurality of liquids such as to float in said liquid with a non-liquid displacing portion of said float device of relatively small but predetermined value, representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein and adjustable means cooperating with said float chamber for automatically determining the quantity of liquid to be admitted for obtaining the relation of the volume of the float and the combined weight of the admitted liquid and said container necessary for said predetermined density relation.

3. A float device adapted to be adjusted to a predetermined density relation with respect to any one of a plurality of liquids such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet orifice at its lower end for admitting liquid therein, a reference means on the exterior surface of said container for indicating the depth approximately, to which said float must sink in a given liquid for obtaining said predetermined density relation and means cooperating with said float chamber and adjustable with respect to said reference means for automatically determining, in a preadjusted position, the quantity of liquid to be admitted for obtaining the relation of the volume of the float and the combined weight of the admitted liquid and said container necessary for said predetermined density relation.

4. A float device adapted to be adjusted to a predetermined density relation with respect to any one of a plurality of liquids such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, adjustable means cooperating with said float chamber for automatically determining the quantity of liquid to be admitted for obtaining the relation of the volume of the float and the combined weight of the admitted liquid and said container necessary for said predetermined density relation, and means for locking said adjustable means in any of its adjusted positions.

5. A float device adapted to be adjusted to a predetermined density relation with respect to any one of a plurality of liquids such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, adjustable means cooperating with said float chamber for automatically determining the quantity of liquid to be admitted for obtaining the relation of the volume of the float and the combined weight of the admitted liquid and said container necessary for said predetermined density relation and indicia means on said last mentioned means to indicate the different positions to which the same may be adjusted for obtaining the desired density relation corresponding to different predetermined liquids.

6. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, an upstanding valve carrying member slidably mounted in said float, upper and lower needle valves mounted at the upper and lower ends respectively of said member and means carried by said valve carrying member for obtaining the relation of the float and the combined weight of the admitted liquid and said container necessary for said predetermined density relation.

7. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, an upstanding hollow valve carrying member slidably mounted in said float, upper and lower needle valves mounted at the upper and lower ends respectively of said member, a connecting passageway between said valve carrying member and said float chamber and means carried by said valve carrying member for obtaining the relation of the float and the combined weight of the admitted liquid and said container necessary for said predetermined density relation.

8. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, an upstanding hollow valve carrying member slidably mounted in said float, upper and lower needle valves mounted at the upper and lower ends respectively of said member, a connecting passageway between said valve carrying member and said float chamber and means carried by said valve carrying member for obtaining the relation of the float and the combined weight of the admitted liquid and said container necessary for said predetermined density relation, said means comprising a standpipe disposed within said valve carrying member having its upper end open to the atmosphere and its lower end registering with said connecting passageway.

9. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein, an upstanding hollow valve carrying member slidably mounted in said float, upper and lower needle valves mounted at the upper and lower ends respectively of said member, a connecting passageway between said valve carrying member and said float chamber and means carried by said valve carrying member for obtaining the relation of the float and the combined weight of the admitted liquid and said container necessary for said predetermined density relation, said means comprising a standpipe disposed within said valve carrying member having its upper end open to the atmosphere and its lower end registering with said connecting passageway, and means for adjusting said valve carrying member and said standpipe in any one of a number of predetermined positions.

10. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising, a container having a chamber provided with an inlet opening at its lower end for admitting said liquid when said float is immersed therein and a reference mark at the upper end, an upstanding hollow valve carrying member having a passageway communicating with said float chamber, upper and lower needle valves mounted at the upper and lower ends respectively of said upstanding member and means carried by said upstanding member and adjustable therewith relative to said reference mark for determining the quantity of liquid to be admitted in said chamber for obtaining the relation of the volume of the float and the combined weight of the admitted liquid and said container necessary for said predetermined density relation.

11. A float device adapted to be adjusted to a predetermined density relation with respect to any given liquid such as to float in said liquid with a non-liquid displacing portion of said float device of relatively small but predetermined value, representing, for each mean unit density of said float device, a density differential between said float device and said liquid that is less than the density differential between said given liquid and another liquid of less density comprising, a container having a chamber having an inlet orifice at its lower end for admitting the liquid when said float is immersed therein, a reference mark on the exterior surface of said float for indicating the depth approximately to which said float device must sink in said reference medium to be adjusted thereto, an upstanding hollow valve carrying member slidably mounted in said float having a passageway communicating with said float chamber, upper and lower needle valves mounted at the upper and lower ends respectively of said upstanding member, means supported against movement by said valve carrying member and adjustable therewith relative to said reference mark and with respect to said float chamber for measuring the quantity of admitted reference medium, said means comprising a standpipe so constructed and arranged within said valve carrying member to limit the quantity of liquid admitted to said chamber and thereby establish the relation between the volume of the float and the combined weight of the container and quantity of admitted liquid in determining the mean unit density of said float device, and indicia means to indicate when said valve carrying member and said standpipe have been positioned to limit the quantity of liquid admitted to a desired value for adjusting said float device to any given one of a number of densities to which it may be adjusted.

12. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density comprising a container having a chamber having an inlet orifice at its lower end for admitting the liquid when said float is immersed therein, reference means on the exterior surface of said float for indicating the depth approximately to which said float device must sink in said liquid to be adjusted thereto, and means carried by said float device and adjustable with respect to said reference means for determining the quantity of admitted liquid for automatically obtaining predetermined relation between the volume of the float and said admitted quantity of liquid, the effective cross-sectional area of said inlet orifice being sufficiently large to permit admission of said liquid in said float chamber in adjusting said float thereto but restricted in an amount sufficient to prevent drainage of the admitted liquid from said float chamber as long as the head of the liquid in which said float device is immersed is greater than the head of the admitted liquid.

13. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density, comprising a container having a chamber provided with an inlet opening at its lower end for admitting said liquid when said float is immersed therein, a valve carried by said container, and means cooperating with said float chamber for automatically determining the quantity of liquid to be admitted for obtaining the relation of the volume of the float and the combined weight of the admitted liquid and said container necessary for said predetermined density relation.

14. A float device adapted to be adjusted to a predetermined density relation with respect to any given liquid such as to float in said liquid with a non-liquid displacing portion of said float device of relatively small but predetermined value representing, for each mean unit density of said float device, a density differential between said float device and said liquid that is less than the density differential between said given liquid and another liquid of less density, comprising a container having a chamber provided with an inlet opening at its lower end for admitting said liquid when said float is immersed therein and means cooperating with said float chamber for automatically determining the quantity of liquid to be admitted for obtaining the relation of the volume of the float and the combined weight of the admitted liquid and said container necessary for said predetermined density relation, the shape of the float and the position of said inlet opening being such that for all tilted positions of the float in the given liquid, the admitted liquid will be confined within the float.

DAVID SAMIRAN.